Oct. 20, 1925.
J. F. DISTEL ET AL
1,557,925
BROODER
Filed Sept. 8, 1924
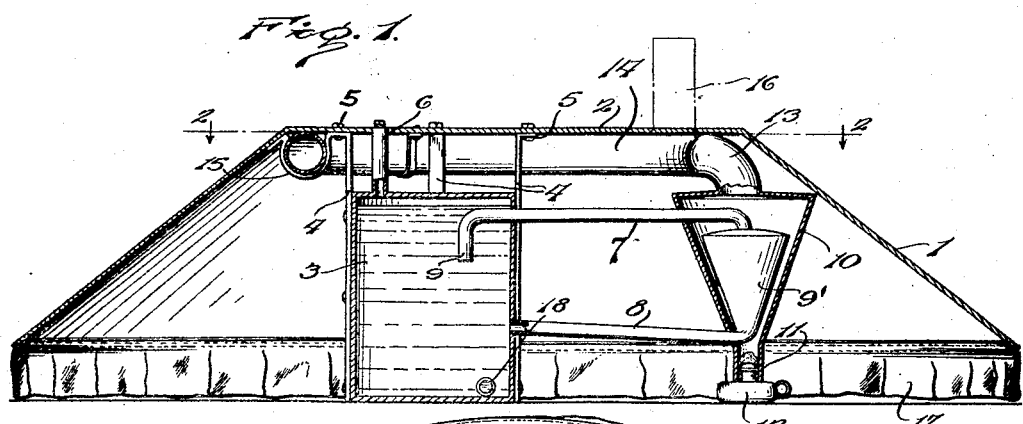
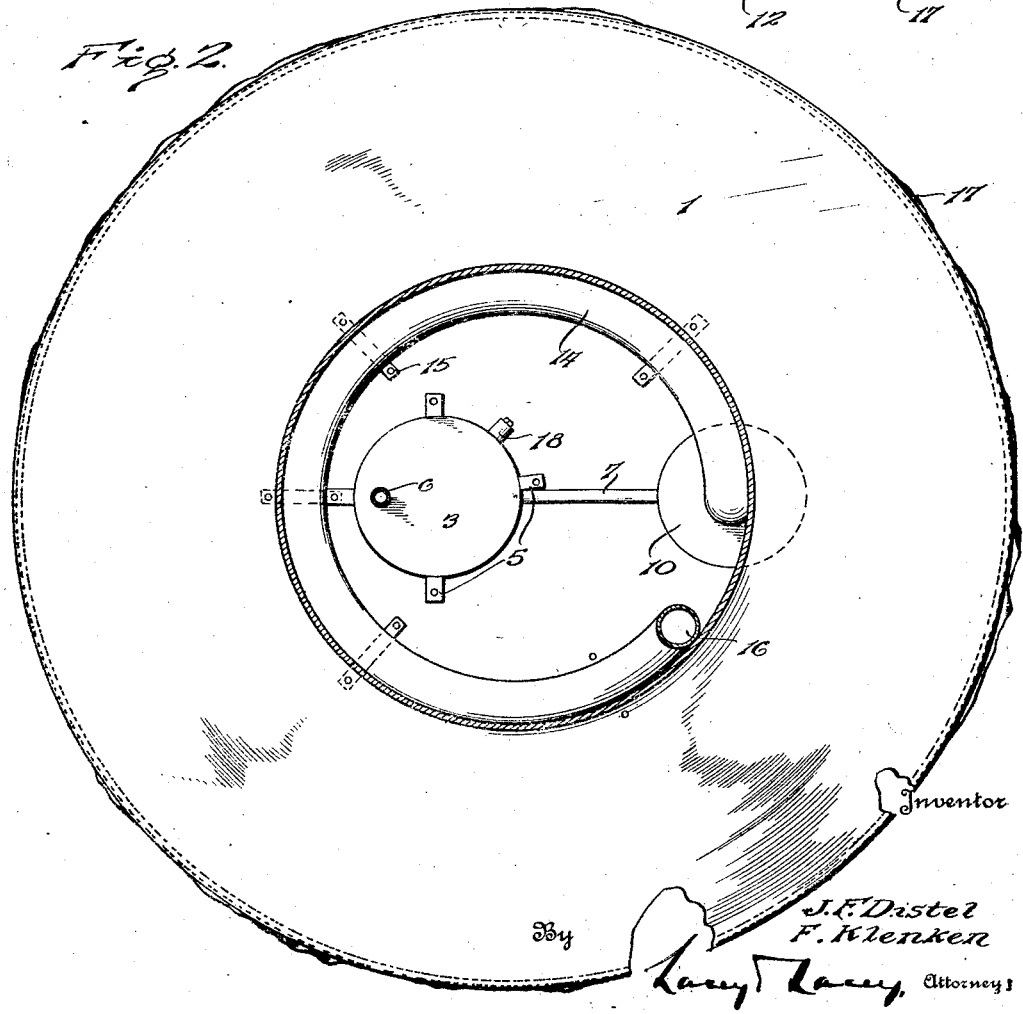

Patented Oct. 20, 1925.

1,557,925

UNITED STATES PATENT OFFICE.

JOSEPH F. DISTEL AND FRANK KLENKEN, OF WILMONT, MINNESOTA.

BROODER.

Application filed September 8, 1924. Serial No. 736,609.

*To all whom it may concern:*

Be it known that we, JOSEPH F. DISTEL and FRANK KLENKEN, citizens of the United States, residing at Wilmont, in the county of Nobles and State of Minnesota, have invented certain new and useful Improvements in Brooders, of which the following is a specification.

This invention relates to brooders and has for its object the provision of a simple and inexpensive device which may be easily constructed and which, when in use, will effectually provide the warmth necessary to the life of very small young chickens. The invention is illustrated in the accompanying drawing and consists in certain novel features which will be particularly pointed out in the appended claims.

In the drawing:

Figure 1 is a section taken diametrically through a brooder embodying our improvements, and Fig. 2 is a horizontal section on the line 2—2 of Fig. 1.

In carrying out our invention, we employ a preferably circular wall 1 which may be constructed of sheet metal or other suitable material. This wall flares downwardly, as clearly shown in Fig. 1, and its upper edge merges into or is rigidly secured to a roof 2 which is preferably flat and may be formed integral with the wall, as shown in Fig. 1. We also employ a tank 3 which may be of any suitable dimensions and is adapted to rest upon the ground or the floor of the chicken house. To the sides of this tank, we secure posts 4 which may be flat metallic bars secured directly to the sides of the tank and project above the tank so that their upper ends may be secured directly to the roof, as shown at 5, the roof being thus supported from the tank and in spaced relation to the tank. A filling nozzle 6 is provided in the top of the tank and rises therefrom through the roof of the brooder so that the supply of water in the tank may be replenished as needed from time to time. Extending laterally from the tank and in communication therewith are the upper and lower circulating heating pipes 7 and 8, the upper pipe 7 having its end extended into the tank and turned downwardly, as shown at 9, so that the water flowing through this pipe will be discharged downwardly within the tank. The lower pipe 8 is inclined downwardly away from the tank, as shown clearly in Fig. 1, and leads into the bottom of a heating tank 9' which is housed within a drum or casing 10, as shown, the pipe 7 leading from the top of the heating tank, as shown and as will be readily understood. The tank 9' and the casing 10 are preferably conical in form with the apex turned downwardly and from the apex of the casing or housing 10 a short cylindrical nozzle 11 depends to fit around the burner of a lamp 12. From the top of the housing 10, a circulating air pipe 13 extends to the roof of the brooder and then passes around below the same in a circular path, as shown at 14, this circulating pipe being supported by clips or hangers 15 fastened firmly to the roof of the brooder and passing below and under the pipe. After passing around the brooder, the circulating pipe is turned upwardly so as to pass through the roof, as indicated at 16, whereby the products of combustion and foul odors may readily escape.

The usual curtain 17 may be secured to the lower edge of the wall 1 so that the young chickens may readily pass into the brooder or leave the same and will be protected from the effects of cold air drafts.

When the lamp 12 has been ignited, the flame of the same will play directly upon the lower end of the heating tank 9' and the end of the pipe 8 leading into the same so that the water will be quickly heated and will start to circulate through the tanks and the pipes 7 and 8 in an obvious manner. At the same time the heated air currents and products of combustion from the lamp will pass around the tank through the housing 10 and then pass out through the pipes 13 and 14. It will thus be seen that the heat plays over practically the entire surface of the heating tank and before passing into the outside air is caused to circulate within the brooder immediately below the roof of the same and along the upper edge of the side wall so that the temperature of the brooder will be raised and kept at the proper degree to sustain the lives of the chickens. The device is exceedingly simple in construction and free of complicated arrangement of parts. If access to the interior of the brooder is necessary at any time, it is merely lifted so that all the parts will rise together except the lamp which will be left in place. The brooder may then be easily inverted so that all the parts can be inspected, and this inversion will not result in any spilling or loss of the heating water inasmuch as the tanks are closed and the pipes are not open except as they are in communication with the tanks.

The tank 3 may be provided with a drain pipe, indicated at 18, to permit the water to be drawn off, if the occasion should arise.

Having thus described the invention, we claim:

1. In a brooder, the combination of an enclosing structure, a storage tank disposed within the structure, means whereby the enclosing structure will be supported by the tank, a heating tank, circulating pipes connecting the heating tank with the storage tank, a housing supported by said pipes around and in spaced relation to the heating tank, means for applying heat to the lower end of the heating tank, and an outlet pipe rising from said housing and extending around the enclosing structure immediately below the top of the same.

2. A brooder comprising a downwardly flared circular wall, a roof connecting the upper edge of the wall, a storage tank disposed within the space defined by the wall, means whereby said tank may be filled from a point above the roof, means whereby the roof and the wall will be supported from the tank, a heater disposed at one side of the storage tank, a housing fitting about and rising from the heater, a heating tank disposed within said housing, circulating pipes connecting the heating tank with the storage tank, and a flue rising from the housing and extending around the wall immediately below the roof and having one end carried through the roof to discharge into the open air.

In testimony whereof we affix our signature.

JOSEPH F. DISTEL. [L. S.]
FRANK KLENKEN. [L. S.]